US010370465B2

(12) United States Patent
Itakura et al.

(10) Patent No.: US 10,370,465 B2
(45) Date of Patent: Aug. 6, 2019

(54) PROPYLENE HOMOPOLYMER FOR STRESS-RESISTANT MOLDED ARTICLE, COMPOSITION CONTAINING THE POLYMER, AND STRESS-RESISTANT MOLDED ARTICLES OBTAINED THEREFROM

(75) Inventors: Keita Itakura, Ichihara (JP); Toshiyuki Ishii, Chiba (JP); Rikuo Onishi, Ichihara (JP); Satoshi Hashizume, Takaishi (JP)

(73) Assignees: PRIME POLYMER CO., LTD., Tokyo (JP); MITSUI CHEMICALS, INC., Tokyo (JP)

( * ) Notice: Subject to any disclaimer, the term of this patent is extended or adjusted under 35 U.S.C. 154(b) by 478 days.

(21) Appl. No.: 12/448,983

(22) PCT Filed: Jan. 17, 2008

(86) PCT No.: PCT/JP2008/050540
§ 371 (c)(1),
(2), (4) Date: Jul. 17, 2009

(87) PCT Pub. No.: WO2008/088022
PCT Pub. Date: Jul. 24, 2008

(65) Prior Publication Data
US 2010/0004384 A1   Jan. 7, 2010

(30) Foreign Application Priority Data
Jan. 18, 2007 (JP) ................................. 2007-009387

(51) Int. Cl.
*C08L 23/12* (2006.01)
*C08F 110/06* (2006.01)
*C08F 4/659* (2006.01)
*C08K 7/14* (2006.01)
*C08L 23/16* (2006.01)

(52) U.S. Cl.
CPC ............. *C08F 110/06* (2013.01); *C08L 23/12* (2013.01); *C08F 4/65912* (2013.01); *C08F 4/65916* (2013.01); *C08K 7/14* (2013.01); *C08L 23/16* (2013.01)

(58) Field of Classification Search
CPC ...... C08F 110/06; C08F 210/16; C08L 23/12; C08L 23/16; C08K 7/14
USPC ....................................................... 526/351
See application file for complete search history.

(56) References Cited

U.S. PATENT DOCUMENTS

| | | | | |
|---|---|---|---|---|
| 3,385,516 A | * | 5/1968 | Omohundro | 416/93 R |
| 4,902,738 A | * | 2/1990 | Mitsuno et al. | 524/525 |
| 6,515,086 B1 | | 2/2003 | Razavi | |
| 6,573,352 B1 | | 6/2003 | Tatsumi et al. | |
| 6,939,928 B1 | | 9/2005 | Kawai et al. | |
| 7,019,157 B2 | | 3/2006 | Uwai et al. | |
| 7,081,493 B2 | * | 7/2006 | Kawai et al. | 524/505 |
| 7,300,903 B2 | | 11/2007 | Fujita et al. | |
| 7,402,638 B2 | | 7/2008 | Matsumura et al. | |
| 2001/0002610 A1 | * | 6/2001 | Teramoto et al. | 156/199 |
| 2002/0173583 A1 | * | 11/2002 | Shimizu | 524/515 |
| 2003/0236338 A1 | * | 12/2003 | Kitano | C08K 3/40 524/494 |
| 2004/0122196 A1 | * | 6/2004 | Pierini et al. | 526/351 |
| 2004/0171782 A1 | | 9/2004 | Lin et al. | |
| 2004/0204310 A1 | * | 10/2004 | Gauthier et al. | 502/103 |
| 2005/0008483 A1 | * | 1/2005 | Braun et al. | 415/206 |
| 2006/0222849 A1 | | 10/2006 | Matsumura et al. | |
| 2007/0037914 A1 | * | 2/2007 | Heck et al. | 524/451 |
| 2009/0075078 A1 | | 3/2009 | Yano et al. | |
| 2009/0078078 A1 | | 3/2009 | Yano et al. | |
| 2011/0003953 A1 | | 1/2011 | Kirillov et al. | |

FOREIGN PATENT DOCUMENTS

| | | |
|---|---|---|
| EP | 1 302 508 A1 | 4/2003 |
| JP | S40-23798 | 10/1965 |
| JP | S42-8704 | 4/1967 |
| JP | S43-6636 | 3/1968 |
| JP | S46-20814 | 6/1971 |
| JP | H07-032401 A | 2/1995 |
| JP | 10-7727 | 1/1998 |
| JP | 10-338717 | 12/1998 |
| JP | 11-100412 | 4/1999 |
| JP | 11-315109 | 11/1999 |

(Continued)

OTHER PUBLICATIONS

Enlgish Translation of JP 2004231911 A.*
English translation of JP 2001302860 A.*
Atkinson, Carole M.L., et al., "Gel Permeation Chromatography: Universal Calibration for Polypropylene", Die Makromolekulare Chemie, vol. 177, No. 1, Jan. 1976, pp. 213-231.
Dawkins, J.V., et al., "Gel-Premeation Chromatography: Examination of Universal Calibration Procedures for Polydimethylsiloxane in a Poor Solvent", Journal of Polymer Science: Part A-2, vol. 8, No. 10, Oct. 1970, pp. 1803-1821.

(Continued)

*Primary Examiner* — Roberto Rabago
(74) *Attorney, Agent, or Firm* — Foley & Lardner LLP

(57) ABSTRACT

Propylene polymers and propylene resin compositions containing the polymers are used as molded articles used under stress for a long period such as automotive parts, housing parts, home appliance parts and electric power tool parts. Stress-resistant molded articles of the invention are obtained from these materials. A propylene homopolymer (A) satisfies the following requirements (1) to (3), and a polypropylene resin composition contains the propylene homopolymer (A). (1) The ratio (Mw/Mn) of weight average molecular weight (Mw) to number average molecular weight (Mn) according to GPC is in the range of 1.2 to 3.5. (2) Mn is in the range of 35,000 to 400,000. (3) The content of components soluble in o-dichlorobenzene at 90° C. is not more than 4 wt %.

6 Claims, 1 Drawing Sheet

(56) References Cited

FOREIGN PATENT DOCUMENTS

| | | | |
|---|---|---|---|
| JP | 2000-109519 | 4/2000 | |
| JP | 2001302860 A * | 10/2001 | ............ C08L 23/10 |
| JP | T-2002-510358 | 4/2002 | |
| JP | 2002-234976 | 8/2002 | |
| JP | 2002-241436 | 8/2002 | |
| JP | 2002-284817 A | 10/2002 | |
| JP | 2003-321555 | 11/2003 | |
| JP | 2004-2837 | 1/2004 | |
| JP | A-2004-051801 | 2/2004 | |
| JP | 2004-506788 | 3/2004 | |
| JP | A-2004-083686 | 3/2004 | |
| JP | 2004231911 A * | 8/2004 | ............ C08L 23/00 |
| JP | 2006-28449 | 2/2006 | |
| JP | 2006-057010 A | 3/2006 | |
| JP | 2006-117839 | 5/2006 | |
| JP | 2006-249167 A | 9/2006 | |
| JP | 2006-274114 A | 10/2006 | |
| JP | 2006-291171 | 10/2006 | |
| WO | WO 01/27124 | 4/2001 | |
| WO | WO-2006/134098 | 12/2006 | |

OTHER PUBLICATIONS

Communication (Supplementary EP Search Report) in EP Appln No. 08 70 3395 dated May 12, 2011.
Japanese Office Action for JP 2008-554081 dated Jun. 4, 2013.
Office Action issued in Japanese Patent Application No. 2013-212910 dated Dec. 16, 2014.

* cited by examiner

[Fig.1]
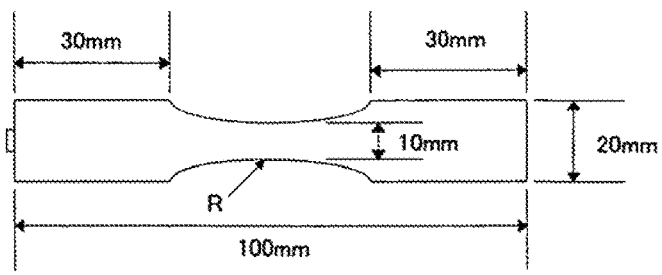
[Fig.2]
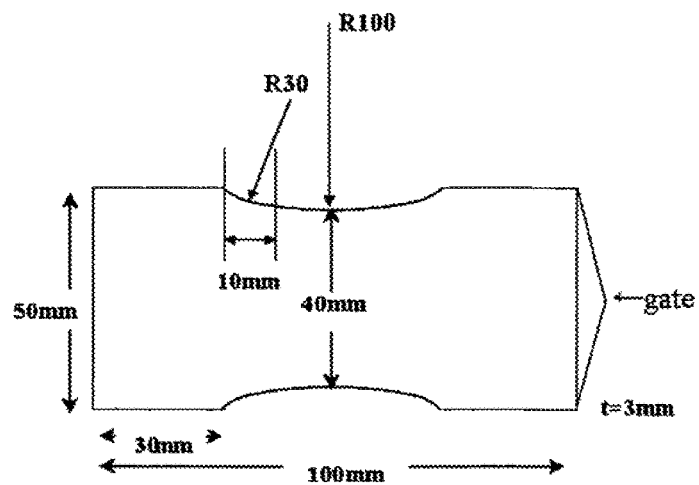
[Fig.3]
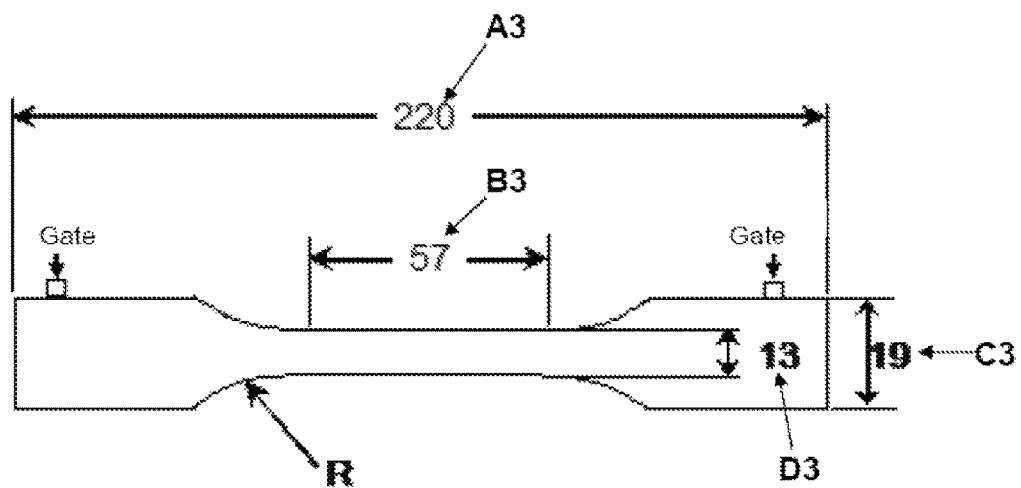

PROPYLENE HOMOPOLYMER FOR STRESS-RESISTANT MOLDED ARTICLE, COMPOSITION CONTAINING THE POLYMER, AND STRESS-RESISTANT MOLDED ARTICLES OBTAINED THEREFROM

FIELD OF THE INVENTION

The present invention relates to a propylene homopolymer and a polypropylene resin composition containing the propylene homopolymer that are both used for producing stress-resistant molded articles, and to stress-resistant molded articles obtained from these materials. In more detail, the invention relates to a propylene homopolymer and a polypropylene resin composition containing the propylene homopolymer that are both molded into articles used under stress for a long period such as automotive parts, housing parts, home appliance parts and electric power tool parts, and to stress-resistant molded articles obtained from these materials.

BACKGROUND OF THE INVENTION

Polypropylene resins have low specific gravity, high rigidity and good molding properties and are therefore used as various structural parts such as convenience goods, kitchen accessories, home appliances, machine parts, electrical components and automotive parts.

Structural parts used around automobile engines or electrical components such as fans of air conditioner outdoor units are subjected to stress during use sometimes at high temperatures. Accordingly, the structural parts require high vibration fatigue resistance. To reduce deformation under stress, propylene resin compositions are used which are blends of polypropylene and fillers such as talc and glass fibers. Against the backdrop that the use duration of products should be extended, a prolonged life of propylene molded articles is desired. JP-A-2004-002837 and JP-A-2003-321555 disclose that vibration fatigue strength is improved by increasing the molecular weight of polypropylene resin phases. Although vibration fatigue strength is improved by increasing the molecular weight of polypropylene resin phases, flowability during molding is lowered at the same time and it is therefore difficult to adopt this method to the manufacturing of large molded articles.
Patent Document 1: JP-A-2004-002837
Patent Document 2: JP-A-2003-321555

SUMMARY OF THE INVENTION

It is an object of the present invention to provide propylene homopolymers and polypropylene resin compositions containing the homopolymers that are both capable of giving molded articles having excellent stress resistant properties. In detail, it is an object of the invention to provide propylene homopolymers or polypropylene resin compositions containing the homopolymers that are suitably molded into articles used under stress for a long period such as automotive parts, housing parts, home appliance parts and electric power tool parts, and to provide stress-resistant molded articles obtained from these materials.

The present inventors studied diligently to achieve the above object and have found that specific propylene homopolymers and compositions thereof are suitably used for stress-resistant molded articles. The present invention has been completed based on the finding.

A first aspect of the present invention is directed to a propylene homopolymer (A) for stress-resistant molded articles which satisfies the following requirements (1) to (3):

(1) the ratio (Mw/Mn) of weight average molecular weight (Mw) to number average molecular weight (Mn) according to GPC is in the range of 1.2 to 3.5;

(2) Mn is in the range of 35,000 to 400,000;

(3) the content of components soluble in o-dichlorobenzene at 90° C. is not more than 4 wt %.

The propylene homopolymer (A) for stress-resistant molded articles preferably satisfies the following requirement (4):

(4) the melting point (Tm) is not less than 155° C.

The melting point (Tm) is more preferably not less than 157° C.

A second aspect of the present invention is directed to a polypropylene resin composition for stress-resistant molded articles which comprises the propylene homopolymer (A).

According to a first embodiment, the polypropylene resin composition for stress-resistant molded articles comprises the propylene homopolymer (A) at 50 to 99 wt % and an elastomer (B) at 1 to 50 wt % (wherein the total of the propylene homopolymer (A) and the elastomer (B) is 100 wt %).

According to a second embodiment, the polypropylene resin composition for stress-resistant molded articles comprises the propylene homopolymer. (A) at 30 to 95 wt % and a filler (C) at 5 to 70 wt % (wherein the total of the propylene homopolymer (A) and the filler (C) is 100 wt %).

According to a third embodiment, the polypropylene resin composition for stress-resistant molded articles comprises the propylene homopolymer (A) at 29 to 94 wt %, an elastomer (B) at 1 to 60 wt % and a filler (C) at 5 to 70 wt % (wherein the total of the propylene homopolymer (A), the elastomer (B) and the filler (C) is 100 wt %).

Preferably, the elastomer (B) is a random copolymer of ethylene and a C3-20 α-olefin and contains a structural unit derived from ethylene and a structural unit derived from the α-olefin in a molar ratio (ethylene-derived structural unit/α-olefin-derived structural unit) of 95/5 to 15/85.

The filler (C) is preferably glass fibers or organic fibers, and is more preferably long glass fibers or short glass fibers.

A third aspect of the present invention is directed to a stress-resistant molded article obtained from the propylene homopolymer (A) wherein the stress-resistant molded article is preferably formed by injection molding.

A fourth aspect of the present invention is directed to a stress-resistant molded article obtained from the polypropylene resin composition wherein the stress-resistant molded article is preferably formed by injection molding.

According to the present invention, stress-resistant molded articles without degradation in strength or impact resistance may be obtained even by injection molding with a mold that is designed such that weld lines would be formed. In an embodiment of the present invention, the stress-resistant molded article may be a molded article having a metal insert. In this case, the molded article can long withstand internal stress caused by difference in coefficient of linear expansion between the polypropylene resin composition and the metal.

The stress-resistant molded article is preferably an automotive part, a two-wheeled vehicle or bicycle part, a housing part, a home appliance part or an electric power tool part, and is more preferably an engine fan, a cooling fan or a fan shroud.

Advantages of the Invention

The propylene homopolymers, and the polypropylene resin compositions containing the homopolymers can give propylene molded articles having excellent fatigue strength. The stress-resistant molded articles of the invention may be used under stress in a vibrating environment for a long period.

BRIEF DESCRIPTION OF THE DRAWINGS

FIG. 1 shows a shape of a test piece for vibration fatigue test that is molded from a propylene homopolymer (A) or a polypropylene resin composition containing an elastomer (B). In FIG. 1, R is a notch radius and R≈50 mm. The thickness of the test piece is 0.392 cm.

FIG. 2 shows a shape of a test piece for vibration fatigue test that is a (non-welded) GFPP molded article.

FIG. 3 shows a shape of a test piece for vibration fatigue test that is a (welded) GFPP molded article. In FIG. 3, all the numbers indicate millimeters (mm), R is a notch radius and R=76 mm. The test piece has a whole length (A3) of 220 mm; a central line portion length (B3) of 57 mm; a terminal width (C3) of 19 mm; and a central line portion width (D3) of 13 mm. The thickness of the test piece is 3.2 mm.

BEST MODE FOR CARRYING OUT THE INVENTION

The propylene homopolymers (A) for stress-resistant molded articles (also referred to as the propylene homopolymers (A)), the polypropylene resin compositions for stress-resistant molded articles (also referred to as the polypropylene resin compositions) and the stress-resistant molded articles obtained therefrom will be described in detail hereinbelow. In the present invention, the words "stress-resistant molded articles" are a collective term for molded articles that can be used in applications as described later where parts are subjected to continuous or repeated stress but the life of the parts is required to be at least one year.

<Propylene Homopolymers (A)>

The propylene homopolymers (A) according to the present invention satisfy the following requirements (1) to (3) and preferably further satisfy the requirement (4).

(1) The ratio (Mw/Mn) of weight average molecular weight (Mw) to number average molecular weight (Mn) according to GPC is in the range of 1.2 to 3.5.

(2) Mn is in the range of 35,000 to 400,000.

(3) The content of components soluble in o-dichlorobenzene at 90° C. is not more than 4 wt %.

(4) The melting point (Tm) is not less than 155° C.

The requirements (1) to (3) and preferred requirement (4) for the propylene homopolymers (A) will be described in detail below.

Requirement (1)

The propylene homopolymers (A) have a ratio (Mw/Mn) of weight average molecular weight (Mw) to number average molecular weight (Mn) according to GPC in the range of 1.2 to 3.5, preferably 2.0 to 3.0, and more preferably 2.0 to 2.5. If Mw/Mn exceeds 3.5, low-molecular weight components increase in the propylene homopolymer and vibration fatigue strength and creep resistance are lowered; such homopolymer is not suited for molded articles used under stress for a long period.

If Mw/Mn is less than 1.2, molding properties such as flowability during injection molding or extrudability are deteriorated.

Requirement (2)

The propylene homopolymers (A) have Mn in the range of 35,000 to 400,000, preferably 50,000 to 200,000, and more preferably 65,000 to 150,000. If Mn is less than 35,000, low-molecular weight components increase in the propylene homopolymer and vibration fatigue strength and creep resistance are lowered; such homopolymer is not suited for molded articles used under stress for a long period. If Mn exceeds 400,000, excessively lowered flowability is encountered with molding and the molding efficiency is deteriorated.

Requirement (3)

In the propylene homopolymers (A), the content of components soluble in o-dichlorobenzene at 90° C. is not more than 4 wt %, preferably not more than 2 wt %, and more preferably not more than 1 wt %. If the polymer contains more than 4 wt % of components soluble in o-dichlorobenzene at 90° C., the amounts of low-crystalline and low-molecular weight propylene homopolymer components are large, and vibration fatigue strength and creep resistance of molded articles are deteriorated.

Requirement (4)

The propylene homopolymers (A) preferably have a melting point (Tm) of not less than 155° C., more preferably not less than 157° C., and still more preferably not less than 160° C. When the melting point (Tm) of the propylene homopolymer (A) is 155° C. or above, creep resistance and vibration fatigue strength are enhanced and the propylene homopolymer (A) is suitably used as stress-resistant molded articles.

The propylene homopolymers (A) reliably achieve the advantages of the invention as long as they satisfy the requirements (1) to (3), and preferably the requirements (1) to (4). Accordingly, other properties of the propylene homopolymers (A) are not particularly limited. From the viewpoints of molding efficiency and impact resistance of molded articles, the melt flow rate (MFR) of the propylene homopolymer (A) measured at a temperature of 230° C. under 2.16 kg load is generally in the range of 0.1 to 200 (g/10 min), preferably 0.5 to 100 (g/10 min), more preferably 1.0 to 80 (g/10 min), and particularly preferably 2.0 to 50 (g/10 min). MFR less than 0.1 (g/10 min) causes excessively low flowability in processing. If MFR exceeds 200 (g/10 min), the molecular weight is excessively low and the molded articles may have insufficient fatigue properties and impact resistance.

The processes for producing the propylene homopolymers (A) are not particularly limited as long as the propylene homopolymers (A) satisfy the requirements (1) to (3), and preferably the requirements (1) to (4). Generally, the polymers may be produced by homopolymerizing propylene in the presence of a polymerization catalyst that includes a metallocene compound having a cyclopentadienyl skeleton in the molecule.

Examples of the metallocene compounds having a ligand with a cyclopentadienyl skeleton include two kinds of chemical structures: metallocene compounds (D1) represented by Formula [I] and bridged metallocene compounds (D2) represented by Formula [II]. Of these, the bridged metallocene compounds (D2) are preferable.

[Chem. 1]

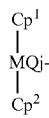

[I]

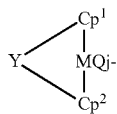

wherein M is a titanium atom, a zirconium atom or a hafnium atom; Q is selected from halogen atoms, hydrocarbon groups, anionic ligands and neutral ligands capable of coordination by lone pair electrons; j is an integer of 1 to 4; and $Cp^1$ and $Cp^2$ may be the same or different from each other and are each a cyclopentadienyl group or a substituted cyclopentadienyl group capable of forming a sandwich structure together with M. The substituted cyclopentadienyl groups include indenyl group, fluorenyl group, azulenyl group and substituted groups of these groups that are substituted with at least one hydrocarbyl group, wherein the double bonds in the unsaturated ring(s) condensed to the cyclopentadienyl group in the indenyl group, the fluorenyl group or azulenyl group may be partly or completely hydrogenated. In Formula [II], Y is a C1-20 divalent hydrocarbon group, a C1-20 divalent halogenated hydrocarbon group, a divalent silicon-containing group, a divalent germanium-containing group, a divalent tin-containing group, —O—, —Co—, —S—, —SO—, —SO$_2$—, —Ge—, —Sn—, —NR$^a$—, —P(R$^a$)—, —P(O) (R$^a$)—, —BR$^a$— or —AlR$^a$— (wherein R$^a$ may be the same or different and is a C1-20 hydrocarbon group, a C1-20 halogenated hydrocarbon group, a hydrogen atom, a halogen atom or a nitrogen compound residue in which one or two C1-20 hydrocarbon groups are bonded to a nitrogen atom).

Polymerization catalysts suitably used in the present invention are metallocene catalysts as disclosed in WO 01/27124 by one of the present applicants. In detail, the metallocene catalysts include a bridged metallocene compound represented by Formula [III] below, at least one compound selected from organometallic compounds, organoaluminum oxy-compounds and compounds capable of reacting with the metallocene compound to form an ion pair, and optionally a particulate carrier.

[Chem. 2]

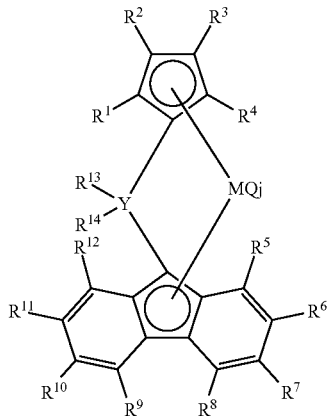

In Formula [III], $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ may be the same or different and are each a hydrogen atom, a hydrocarbon group or a silicon-containing group. Examples of the hydrocarbon groups include linear hydrocarbon groups such as methyl, ethyl, n-propyl, allyl, n-butyl, n-pentyl, n-hexyl, n-heptyl, n-octyl, n-nonyl and n-decanyl groups; branched hydrocarbon groups such as isopropyl, tert-butyl, amyl, 3-methylpentyl, 1,1-diethylpropyl, 1,1-dimethylbutyl, 1-methyl-1-propylbutyl, 1,1-propylbutyl, 1,1-dimethyl-2-methylpropyl and 1-methyl-1-isopropyl-2-methylpropyl groups; saturated cyclic hydrocarbon groups such as cyclopentyl, cyclohexyl, cycloheptyl, cyclooctyl, norbornyl and adamantyl groups; unsaturated cyclic hydrocarbon groups such as phenyl, tolyl, naphthyl, biphenyl, phenanthryl and anthracenyl groups; saturated hydrocarbon groups substituted with unsaturated cyclic hydrocarbon groups such as benzyl, cumyl, 1,1-diphenylethyl and triphenylmethyl groups; and heteroatom-containing hydrocarbon groups such as methoxy, ethoxy, phenoxy, furyl, N-methylamino, N,N-dimethylamino, N-phenylamino, pyrryl and thienyl groups. The silicon-containing groups include trimethylsilyl, triethylsilyl, dimethylphenylsilyl, diphenylmethylsilyl and triphenylsilyl groups. Adjacent groups of $R^5$ through $R^{12}$ may be linked together to form a ring. Examples of such substituted fluorenyl groups include benzofluorenyl, dibenzofluorenyl, octahydrodibenzofluorenyl, octamethyloctahydrodibenzofluorenyl and octamethyltetrahydrodicyclopentafluorenyl groups.

In the metallocene compounds of Formula [III], $R^1$, $R^2$, $R^3$ and $R^4$ on the cyclopentadienyl ring are each preferably a hydrogen atom or a C1-20 hydrocarbon group. It is more preferable that $R^2$ and $R^4$ are each a C1-20 hydrocarbon group. It is particularly preferable that $R^1$ and $R^3$ are each a hydrogen atom, and $R^2$ and $R^4$ are each a C1-5 linear or branched alkyl group.

In Formula [III], $R^5$ to $R^{12}$ on the fluorenyl ring are each preferably a hydrogen atom or a C1-20 hydrocarbon group. Examples of the C1-20 hydrocarbon groups include those described above. Adjacent groups of $R^5$ through $R^{12}$ may be linked together to form a ring. In a preferred embodiment, $R^6$, $R^7$, $R^{10}$ and $R^{11}$ on the fluorenyl ring are not hydrogen atoms at the same time.

In the metallocene compounds of Formula [III], Y that bridges the cyclopentadienyl ring and the fluorenyl ring is preferably a Group 14 element, more preferably carbon, silicon or germanium, and still more preferably a carbon atom.

The substituents $R^{13}$ and $R^{14}$ bonding to Y are each a C1-20 hydrocarbon group, and preferably a C1-3 alkyl group or a C6-20 aryl group, and they may be the same or different and may be linked together to form a ring. Preferred examples of the substituents include methyl, ethyl, phenyl and tolyl groups. $R^{13}$ or $R^{14}$ may be linked to any substituent from $R^5$ to $R^{12}$ (generally $R^5$ or $R^{12}$) or any substituent from $R^1$ to $R^4$ (generally $R^1$ or $R^4$) to form a ring.

In Formula [III], M is preferably a Group 4 transition metal, and more preferably titanium, zirconium or hafnium. Q is a halogen atom, a hydrocarbon group, an anionic ligand or a neutral ligand capable of coordination by lone pair electrons, and may be the same or different from each other. The letter j is an integer of 1 to 4. When j is 2 or greater, the plurality of Q may be the same or different from each other. Examples of the halogen atoms include fluorine, chlorine, bromine and iodine. Examples of the hydrocarbon groups include those described hereinabove. Examples of the anionic ligands include alkoxy groups such as methoxy, tert-butoxy and phenoxy; carboxylate groups such as acetate and benzoate; and sulfonate groups such as mesylate and tosylate. Examples of the neutral ligands capable of coordination by lone pair electrons include organophosphorus compounds such as trimethylphosphine, triethylphosphine, triphenylphosphine and diphenylmethylphosphine; and ethers such as tetrahydrofuran, diethylether, dioxane and 1,2-dimethoxyethane. It is preferable that at least one Q is a halogen atom or an alkyl group.

Preferred examples of the bridged metallocene compounds include dimethylmethylene(3-tert-butyl-5-methylcyclopentadienyl)(3,6-di-tert-butylfluorenyl)zirconium dichloride, 1-phenylethylidene(4-tert-butyl-2-methylcyclopentadienyl)(octamethyloctahydrodibenzofluorenyl)zirconium dichloride and [3-(1',1',4',4',7',7',10',10'-octamethyloctahydrodibenzo [b,h]fluorenyl)(1,1,3-trimethyl-5-tert-butyl-1,2,3,3a-tetrahydropentalene)]zirconium dichloride.

In the metallocene catalysts used in the invention, the metallocene compounds of Formula [III] are used together with at least one compound (cocatalyst) selected from organometallic compounds, organoaluminum oxy-compounds and compounds capable of reacting with the metallocene compounds to form an ion pair, and optionally particulate carriers. These components are not particularly limited and may be compounds disclosed in WO 01/27124 or JP-A-H11-315109 filed by one of the present applicants.

In the working examples of the present invention described later, the metallocene compound used is dimethylmethylene(3-tert-butyl-5-methylcyclopentadienyl)(3,6-di-tert-butylfluorenyl)zirconium dichloride that corresponds to Formula [III] in which $R^1$ and $R^3$ are hydrogen atoms, $R^2$ is a tert-butyl group, $R^4$ is a methyl group, $R^7$ and $R^{10}$ are tert-butyl groups, $R^5$, $R^6$, $R^8$, $R^9$, $R^{11}$ and $R^{12}$ are hydrogen atoms, Y is a carbon atom, $R^{13}$ and $R^{14}$ are methyl groups, M is a zirconium atom, Q is a chlorine atom and j is 2. In the working examples, propylene homopolymers (A) were produced by prepolymerization and multistage polymerization in the presence of the above metallocene compound, a solid catalyst component in which methylaluminoxane as a cocatalyst was supported on a silica carrier, and triethylaluminum. However, the polymerization conditions in the present invention are not limited thereto.

<Polypropylene Resin Compositions>

The polypropylene resin compositions of the present invention contain the propylene homopolymer (A) as an essential constituent component. The polypropylene resin compositions may contain the propylene homopolymer (A) and additives as described later. In a preferred embodiment, the polypropylene resin compositions contain the propylene homopolymer (A) and at least one selected from an elastomer (B) and a filler (C).

Specifically, preferred embodiments of the propylene resin compositions include the following three embodiments. In one preferred embodiment (hereinafter, also referred to as the first embodiment), the polypropylene resin composition contains the propylene homopolymer (A) and an elastomer (B). In another preferred embodiment (hereinafter, also referred to as the second embodiment), the polypropylene resin composition contains the propylene homopolymer (A) and a filler (C). In the other preferred embodiment (hereinafter, also referred to as the third embodiment), the polypropylene resin composition contains the propylene homopolymer (A), an elastomer (B) and a filler (C).

Illustrative and non-limiting examples will be presented below with regard to suitable applications of the respective polypropylene resin compositions according to the above three preferred embodiments. However, the embodiments may be appropriately selected by the skilled person depending on use of the polypropylene resin compositions as stress-resistant molded articles as will be described later. Accordingly, the illustrative examples given blow do not restrict the use of the polypropylene resin compositions of the present invention.

The polypropylene resin compositions of the first embodiment that contain the propylene homopolymer (A) and an elastomer (B) may be suitably used as automotive parts such as engine fans and radiator fans, and home appliance parts such as washing machine parts.

The polypropylene resin compositions of the second embodiment that contain the propylene homopolymer (A) and a filler (C) may be suitably used as housing parts such as warm-water cleaning toilet seat parts and bathroom parts, and automotive parts such as engine peripheral parts.

The polypropylene resin compositions of the third embodiment that contain the propylene homopolymer (A), an elastomer (B) and a filler (C) may be suitably used as automotive parts such as frontends, fan shrouds and wheel covers, and two-wheeled vehicle or bicycle parts such as luggage boxes.

Described hereinbelow are the elastomers (B) and fillers (C) that are used in the polypropylene resin compositions according to the three preferred embodiments, and the polypropylene resin compositions that contain the propylene homopolymer (A) and one or more of these components.

<Elastomers (B)>

The elastomers (B) are constituent components used in the polypropylene resin compositions according to the first and third embodiments.

The polypropylene resin compositions (first embodiment) contain the propylene homopolymer (A) and the elastomer (B). From the viewpoints of impact strength and rigidity, the content of the propylene homopolymer (A) is 50 to 99 wt %, preferably 70 to 97 wt %, and more preferably 75 to 95 wt %, and the content of the elastomer (B) is 1 to 50 wt %, preferably 3 to 30 wt %, and more preferably 5 to 25 wt %, based on 100 wt % of the propylene homopolymer (A) and the elastomer (B) combined.

If the elastomer (B) content exceeds the above range, rigidity and heat resistance may be lowered. If the elastomer (B) content is below the above range, sufficient impact resistance may not be obtained.

The polypropylene resin compositions (third embodiment) contain the propylene homopolymer (A), the elastomer (B) and the filler (C). The content of the propylene homopolymer (A) is 29 to 94 wt %, preferably 40 to 82 wt %, and more preferably 50 to 75 wt %, the content of the elastomer (B) is 1 to 60 wt %, preferably 10 to 50 wt %, and more preferably 15 to 40 wt %, and the content of the filler (C) described later is 5 to 70 wt %, preferably 8 to 60 wt %, and more preferably 10 to 60 wt %, based on 100 wt % of the propylene homopolymer (A), the elastomer (B) and the filler (C) combined.

If the elastomer (B) content exceeds the above range, strength and rigidity tend to be lowered. If the elastomer (B) content is below the above range, sufficient impact resistance may not be obtained.

If the filler (C) content exceeds the above range, molding processability may be lowered. If the filler (C) content is below the above range, the obtainable stress-resistant molded articles may not have sufficient rigidity.

Examples of the elastomers (B) include ethylene/α-olefin random copolymers (B-a), ethylene/α-olefin/non-conjugated polyene random copolymers (B-b), hydrogenated block copolymers (B-c), other elastic polymers and mixtures of these polymers.

The ethylene/α-olefin random copolymers (B-a) include random copolymers of ethylene and a C3-20 α-olefin. The ethylene/C3-20 α-olefin random copolymers preferably contain ethylene-derived structural units and α-olefin-derived structural units in a molar ratio (ethylene-derived structural units/α-olefin-derived structural units) of 95/5 to 15/85, and more preferably 80/20 to 25/75.

The ethylene/α-olefin random copolymers (B-a) preferably have MFR measured at 230° C. under 2.16 kg load of not less than 0.1 (g/10 min), and more preferably from 0.5 to 10 (g/10 min) When the α-olefin in the ethylene/α-olefin random copolymer (B-a) is propylene, the resin composition comprises the propylene homopolymer (A) and the ethylene/propylene random copolymer. In this case, a propylene block copolymer (A') may be used instead of such resin composition. The propylene block copolymer (A') may be produced, as described in known literature such as JP-A-2006-28449, by preparing a propylene homopolymer in the first step using the foregoing metallocene catalyst and continuously synthesizing an ethylene/propylene copolymer in the second step.

Examples of the ethylene/α-olefin/non-conjugated polyene random copolymers (B-b) include random copolymer rubbers of ethylene, a C3-20 α-olefin and a non-conjugated polyene. The C3-20 α-olefins include those described hereinabove. The non-conjugated polyethylenes include non-cyclic dienes such as 5-ethylidene-2-norbornene, 5-propylidene-5-norbornene, dicyclopentadiene, 5-vinyl-2-norbornene, 5-methylene-2-norbornene, 5-isopropylidene-2-norbornene and norbornadiene; chain non-conjugated dienes such as 1,4-hexadiene, 4-methyl-1,4-hexadiene, 5-methyl-1,4-hexadiene, 5-methyl-1,5-heptadiene, 6-methyl-1,5-heptadiene, 6-methyl-1,7-octadiene and 7-methyl-1,6-octadiene; and trienes such as 2,3-diisopropylidene-5-norbornene. Of these, 1,4-hexadiene, dicyclopentadiene and 5-ethylidene-2-norbornene are preferred.

The ethylene/α-olefin/non-conjugated polyene random copolymers (B-b) contain structural units derived from ethylene at 94.9 to 30 mol %, preferably 89.5 to 40 mol %, structural units derived from the α-olefin at 5 to 45 mol %, preferably 10 to 40 mol %, and structural units derived from the non-conjugated polyene at 0.1 to 25 mol %, preferably 0.5 to 20 mol % (wherein the total of the structural units from ethylene, the α-olefin and the non-conjugated polyene is 100 mol %).

The ethylene/α-olefin/non-conjugated polyene random copolymers (B-b) preferably have MFR measured at 230° C. under 2.16 kg load of not less than 0.05 (g/10 min), and more preferably from 0.1 to 10 (g/10 min). Specific examples of the ethylene/α-olefin/non-conjugated polyene random copolymers (B-b) include ethylene/propylene/diene terpolymer (EPDM).

The hydrogenated block copolymers (B-c) are hydrogenated products of block copolymers that have blocks represented by Formula (a) or (b) below. They have a hydrogenation rate of not less than 90 mol %, and preferably not less than 95 mol %.

[Chem. 3]

$$X(YX)_n \quad (a)$$

$$(XY)_n \quad (b)$$

The polymer blocks represented by X in Formula (a) or (b) are composed of monovinyl-substituted aromatic hydrocarbons. Examples thereof include styrene and derivatives thereof such as styrene, α-methylstyrene, p-methylstyrene, chlorostyrene, lower alkyl-substituted styrenes and vinylnaphthalene. These hydrocarbons may be used singly, or two or more kinds may be used in combination. The polymer blocks represented by Y in Formula (a) or (b) are composed of conjugated dienes such as butadiene, isoprene and chloroprene. The conjugated dienes may be used singly, or two or more kinds may be used in combination. The letter n is an integer of 1 to 5, and preferably 1 or 2.

Specific examples of the hydrogenated block copolymers (B-c) include hydrogenated products of styrene block copolymers such as styrene/ethylene/butylene/styrene block copolymer (SEBS), styrene/ethylene/propylene/styrene block copolymer (SEPS) and styrene/ethylene/propylene block copolymer (SEP).

The block copolymers to be hydrogenated may be produced by for example block copolymerization in an inert solvent with a lithium or Ziegler catalyst. A detailed production process may be found in JP-B-S40-23798. The hydrogenation may be performed in inert solvents using known hydrogenation catalysts. Detailed hydrogenation processes may be found in JP-B-S42-8704, JP-B-S43-6636 and JP-B-S46-20814. When butadiene is used as a conjugated diene monomer, the percentage of 1,2-insertions in the polybutadiene blocks is desirably 20 to 80 wt %, and preferably 30 to 60 wt %. Some hydrogenated block copolymers (B-c) may be commercially available with examples including KRATON G1657 (registered trademark) (manufactured by Shell Chemicals Japan Ltd.), SEPTON 2004 (registered trademark) (manufactured by KURARAY CO., LTD.) and TUFTEC H1052 (registered trademark) (manufactured by Asahi Kasei Corporation).

The elastomers (B) may be used singly, or two or more kinds may be used in combination.

<Fillers (C)>

In the invention, fillers (C) may be used together with the propylene homopolymer (A) to achieve rigidity of molded articles particularly at high temperatures. In detail, the fillers (C) are constituent components used in the polypropylene resin compositions according to the second and third embodiments. Examples of the fillers (C) include inorganic fillers such as talc, clay, calcium carbonate, mica, silicates, carbonates and glass fibers; and organic fibers such as carbon fibers, polyethylene terephthalate fibers, polyethylene naphthalate fibers and kenaf fibers. Of the inorganic fillers, talc and glass fibers are preferred.

To achieve higher rigidity, higher heat resistance and reduced weight, the fillers (C) are preferably glass fibers or organic fibers, and more preferably long glass fibers or short glass fibers.

When talc is used as a filler (C) in the polypropylene resin compositions of the second and third embodiments, the average particle diameter of the talc is desirably 1 to 5 μm, and preferably 1 to 3 μm. The content of talc in the polypropylene resin composition is in the range of 5 to 70 wt %, and preferably 10 to 40 wt %.

The polypropylene resin compositions (second embodiment) contain the propylene homopolymer (A) and the filler (C). From the viewpoints of impact strength and rigidity, the content of the propylene homopolymer (A) is 30 to 95 wt %, preferably 50 to 90 wt %, and the content of the filler (C) is 5 to 70 wt %, preferably 10 to 50 wt %, based on 100 wt % of the propylene homopolymer (A) and the filler (C) combined.

If the filler (C) content exceeds the above range, molding processability may be lowered. If the filler (C) content is below the above range, the obtainable stress-resistant molded articles may not have sufficient rigidity.

When glass fibers are used as a filler (C) in the polypropylene resin compositions according to the second and third embodiments, the glass fibers in the composition are short fibers having a length of 1 mm or less, or are long fibers having a length of 1 mm or more.

When short glass fibers are used as a filler (C) in the polypropylene resin compositions according to the second and third embodiments, the content of the short glass fibers is 5 to 70 wt %, preferably 10 to 50 wt %, and more preferably 20 to 40 wt % of the polypropylene resin composition.

The long glass fibers may be blended in the composition by known methods. In a preferred embodiment, a fiber-reinforced propylene resin containing glass fibers that are surface treated with a sizing agent containing a modified polyolefin resin for modifying glass fibers as described in JP-A-2006-117839 and JP-A-2004-2837, may be formed into pellets 2 to 200 mm in length and blended with the propylene homopolymer (A) or a composition of the propylene homopolymer (A) and the elastomer (B).

When long glass fibers are used as a filler (C) in the polypropylene resin compositions according to the second and third embodiments, the content of the long glass fibers is 5 to 70 wt %, preferably 10 to 70 wt %, and more preferably 35 to 55 wt % of the polypropylene resin composition.

When organic fibers such as polyesters are used as a filler (C) in the polypropylene resin compositions according to the second and third embodiments, the organic fibers may be added by a method disclosed in JP-A-2006-291171. The content of the organic fibers is 5 to 70 wt %, preferably 10 to 50 wt %, and more preferably 20 to 40 wt % of the polypropylene resin composition.

The fillers (C) may be used singly, or two or more kinds may be used in combination.

The polypropylene resin compositions may contain other additives. Exemplary additives include maleic anhydride-modified polypropylene resins as strength or impact resistance improvers, known heat stabilizers, weathering stabilizers, antistatic agents, lubricants, slip agents, hydrochloric acid absorbents, dispersants, nucleating agents and flame-retardants. The amount of the additives may be generally from 0.01 to 10 parts by weight based on 100 parts by weight of the propylene homopolymer (A). In particular, it is preferable in the second and third embodiments involving the fillers (C) that the compositions contain a maleic anhydride-modified polypropylene resin at 0.01 to 10 wt %, and preferably 0.1 to 5 wt % based on the composition.

<Stress-Resistant Molded Articles>

The stress-resistant molded articles according to the present invention may be produced by granulating the propylene homopolymer (A) or the polypropylene resin composition by known methods and molding the pellets by known techniques such as injection molding or extruding.

From the viewpoint of molding cycles, injection molding is preferably used to fabricate the stress-resistant molded articles of the invention. In particular, the present invention provides an advantage hitherto impossible in the art that even when molded articles are formed by injection molding with a mold that is designed such that welds would be formed, stress-resistant molded articles may be obtained in which the lowering in strength at the welds is extremely small.

In the present invention, the "stress-resistant molded articles" are defined as molded articles that can be used in applications where parts are subjected to continuous or repeated stress but the life of the parts is required to be at least one year. In the industry, for example, engine fans or fan shrouds are required to be stress resistant. The engine fans or fan shrouds are repeatedly subjected to stress by engine start and shutdown. Further, these parts contain a metal insert and are used at a wide range of temperatures. Accordingly, internal stress is repeatedly caused by difference in coefficient of linear expansion between the polypropylene resin composition and the metal insert. These parts are therefore required to long withstand external and internal stress.

Because the propylene homopolymers (A) and the polypropylene resin compositions of the present invention have excellent vibration fatigue strength and creep strength, the stress-resistant molded articles may be suitably used in applications where highly reliable properties are required over a long term. The stress-resistant molded articles maintain durability for a long period even when they have a metal insert.

The stress-resistant molded articles from the propylene homopolymers (A) or the polypropylene resin compositions of the invention may be suitably used as automotive parts, two-wheeled vehicle or bicycle parts, housing parts, home appliance parts and electric power tool parts.

The automotive parts include frontends, engine fans, fan shrouds, cooling fans, engine undercovers, radiator boxes, side doors, back door inners, back door outers, outer plates, roof rails, door handles, luggage boxes, wheel covers, handles, cooling moduli, air cleaner parts, air cleaner cases, sheet levers and pedals. The two-wheeled vehicle or bicycle parts include luggage boxes, handles and wheels. The housing parts include warm-water cleaning toilet seat parts, bathroom parts, chair legs, valves and meter boxes. The home appliance parts include OA housings, fans of air conditioner outdoor units and washing machine parts and washing/drying machine parts such as balance rings, spin-drier tray covers, spin-drier trays and outlet guides. The electric power tool parts include electrical power drills. The stress-resistant molded articles are also useful as mower handles, hose joints, resin bottles, concrete frames, pipe joints and power generator covers.

In view of the advantage according to the invention that welds show superior durability against rotational vibration, preferred examples of stress-resistant injection molded articles are engine fans, cooling fans and fan shrouds in which welds are formed in the ring portion.

EXAMPLES

The present invention will be described in greater detail based on examples hereinbelow without limiting the scope of the invention. The following analytical methods were adopted in the invention.

[Measurement of Mn and Mw/Mn]

Mn and Mw/Mn (Mw: weight average molecular weight, Mn: number average molecular weight) of propylene homopolymers (A) were determined by means of GPC-150C Plus (manufactured by Waters Corporation) as follows. The separation columns were TSK gel GMH6-HT and TSK gel GMH6-HTL, each having an inner diameter of 7.5 mm and a length of 600 mm. The column temperature was 140° C. The mobile phase was o-dichlorobenzene (manufactured by Wako Pure Chemical Industries, Ltd.) that contained 0.025 wt % of BHT (manufactured by Wako Pure Chemical Industries, Ltd.) as an antioxidant. The mobile phase was flowed at a rate of 1.0 ml/min. The sample concentration was 0.1 wt %, and 500 µl of the sample was injected. A differential refractometer was used as a detector. Standards used for the measurement were polystyrenes having molecular weights $Mw<1000$ and $Mw>4\times10^6$ (manufactured by Toso Corporation) and polystyrenes having molecular weights $1000 \leq Mw \leq 4 \times 10^6$ (manufactured by Pressure Chemical Co.). The molecular weights were converted in terms of PP using a general calibration method. The Mark-Houwink coefficients of PS and PP described in J. Polym. Sci., Part A-2, 8, 1803 (1970) and Makromol. Chem., 177, 213 (1976) were used.

[Melting point (Tm)]

The melting point (Tm) of propylene homopolymers was determined with a differential scanning calorimeter (DSC, manufactured by PerkinElmer Japan Co., Ltd.). An endothermic peak in the third step in the measurement was defined as the melting point (Tm).

(Measurement Conditions)

First step: Increase the temperature to 240° C. at 10° C./min, and hold it constant for 10 min.
Second step: Lower the temperature to 60° C. at 10° C./min.
Third step: Increase the temperature to 240° C. at 10° C./min.

[MFR (Melt Flow Rate)]

MFR of propylene homopolymers was measured in accordance with ASTM D 1238 (230° C., 2.16 kg load).

[Cross Fractionation Chromatography (CFC)]

Cross fractionation chromatography (CFC) of propylene homopolymers (A) was performed to determine the content of components soluble in o-dichlorobenzene at 90° C.

In detail, components soluble in o-dichlorobenzene were analyzed at various temperatures by cross fractionation chromatography (CFC). The cross fractionation chromatography involved the following apparatus which had a temperature rising elution fractionation (TREF) column for compositional fractionation and a GPC column for molecular weight fractionation. The measurement was carried out under the following conditions, and data at differing temperatures was obtained.

Apparatus: CFC T-150A manufactured by Mitsubishi Yuka Kabushiki Kaisha
Columns: Shodex AT-806MS (×3)
Eluting solution: o-dichlorobenzene
Flow rate: 1.0 ml/min
Sample concentration: 0.3 wt %/vol % (containing 0.1% BHT)
Injection amount: 0.5 ml
Dissolution: complete dissolution
Detector: Infrared absorption detection, 3.42μ (2924 $cm^{-1}$, NaCl plate
Eluting temperatures: 0-135° C., 28 fractions (0, 10, 20, 30, 40, 45, 50, 55, 60, 65, 70, 75, 80, 85, 90, 94, 97, 100, 103, 106, 109, 112, 115, 118, 121, 124, 127, 135 (° C.))

In the measurement, the sample was molten by heating at 145° C. for 2 hours, held at 135° C., cooled to 0° C. at 10° C./h and held at 0° C. for 60 minutes, whereby the sample coated the column carrier. The temperature rising elution column had a volume of 0.83 ml, and the pipe volume was 0.07 ml. The detector was infrared spectroscope MIRAN 1A CVF ($CaF_2$ cell) manufactured by FOXBORO, and infrared ray at 3.42 μm (2924 $cm^{-1}$) was detected in an absorbance mode with a response time of 10 seconds. The eluting temperatures were divided into 28 fractions ranging from 0° C. to 135° C. and were indicated in integers. In detail, the fraction eluted at 94° C. indicates components eluted at 91 to 94° C. The molecular weights of components that were not deposited at 0° C. and of fractions eluted at the respective temperatures were measured and converted in terms of polypropylene using a general calibration curve. The SEC temperature was 135° C., the injection amount of internal standard was 0.5 ml, and the injection position was 3.0 ml. The data sampling time was 0.50 second. The data processing was performed by analysis program CFC data processing (Ver. 1.50) included with the apparatus.

[Density]

The density of injection molded articles was determined in accordance with JIS K 7112.

[Tensile Yield Strength of Injection Molded Articles]

(1) The tensile yield strength of propylene homopolymers (A) and polypropylene resin compositions containing an elastomer (B) was measured in accordance with ASTM D 638.

<Measurement Conditions>

Test piece: ASTM-1 dumbbell
19 mm (width)×3.2 mm (thickness)×165 mm (length)
Tensile rate: 50 mm/min
Chuck distance: 115 mm
Temperatures: 23° C. and 80° C.

(2) The tensile yield strength of polypropylene resin compositions containing a filler (C) (short glass fiber-reinforced PP (GFPP)) was measured in accordance with JIS K 7161.

<Measurement Conditions>

Test piece: multipurpose test piece (ISO-A: 4 mm thick)
Tensile rate: 5 mm/min
Temperature: 23° C.

[Tensile Creep Test for Molded Articles]

A creep test as an accelerated test was performed under the following conditions to evaluate break elongation of molded articles.

<Measurement Conditions>

Test piece: ASTM-1 dumbbell
19 mm (width)×3.2 mm (thickness)×165 mm (length)
Chuck distance: 115 mm
Temperatures: 23° C. and 80° C.
Load: 7.4 MPa (23° C.) and 3.4 MPa (80° C.)

[Vibration Fatigue Test for Molded Articles]

A vibration fatigue test as an accelerated test was performed under the following conditions to determine the cycles to fracture of molded articles.

(1) Vibration Fatigue Test Conditions (Propylene Homopolymers (A))

Test piece shape: See FIG. 1 (thickness: 0.392 cm)
Temperature: 23° C., frequency: 30 Hz, stress: 20 and 25 MPa (tensile deformation)
Chuck distance: 60 mm (2) Vibration Fatigue Test Conditions (Polypropylene Resin Compositions Containing Elastomer (B))

Test piece shape: See FIG. 1 (thickness: 0.392 cm)
Temperature: 23° C., frequency: 30 Hz, stress: 10 MPa (tensile deformation)
Chuck distance: 60 mm (3) Vibration Fatigue Test Conditions (Polypropylene Resin Compositions Containing Filler (C) (Short Glass Fiber-Reinforced PP (GFPP))

<Non-Welded (Weld-Free) Molded Articles>

Test piece shape: See FIG. 2 (thickness: 3.2 mm) (R30 is a notch radius of 30 mm and R100 is a notch radius of 100 mm)
Temperature: 80° C., frequency: 16 Hz, stress: 12.5 MPa and 15 MPa (tensile deformation)
Chuck distance: 60 mm <Welded Molded Articles>

Test piece shape: See FIG. 3 (thickness: 3.2 mm)
Temperature: 85° C., frequency: 1 Hz, stress: 5 MPa (tensile deformation)
Chuck distance: 115 mm

Example 1

[Production of Propylene Homopolymer (A-1)]
(1) Production of Solid Catalyst Carrier 300 g of $SiO_2$ was sampled in a 1-liter branched flask and mixed with 800 ml of toluene to give a slurry. The slurry was transferred to a 5-liter four-necked flask and 260 ml of toluene was added. Subsequently, 2830 ml of a toluene solution of methylaluminoxane (hereinafter, MAO) (10 wt % solution) was added, and the mixture was stirred at room temperature for 30 minutes. The mixture was then heated to 110° C. in 1 hour and reacted for 4 hours. After the completion of the reaction, the reaction liquid was cooled to room temperature. The toluene supernatant was removed, and new toluene was added. This substitution was repeated until the substitution rate reached 95%.

(2) Production of Solid Catalyst (Supporting of Metal Catalyst Component on Carrier)

In a glove box, 2.0 g of dimethylmethylene(3-tert-butyl-5-methylcyclopentadienyl)(3,6-di-tert-butylfluorenyl)zirconium dichloride was weighed in a 5-liter four-necked flask. The flask was taken outside the glove box, and 0.46 L of toluene and 1.4 L of the MAO/$SiO_2$/toluene slurry prepared in (1) were added under a nitrogen atmosphere. The mixture was stirred for 30 minutes to produce a supported catalyst. The resultant dimethylmethylene(3-tert-butyl-5-methylcyclopentadienyl)(3,6-di-tert-butylfluorenyl)zirconium dichloride/MAO/$SiO_2$/toluene slurry was treated with n-heptane to 99% substitution rate. The final slurry volume was controlled to 4.5 L. These operations were carried out at room temperature.

(3) Production of Prepolymerized Catalyst

A 200-liter autoclave equipped with a stirrer was charged with 404 g of the solid catalyst component prepared in (2), 218 ml of triethylaluminum and 100 L of heptane. While the inside temperature was maintained at 15 to 20° C., 1212 g of ethylene was added and reaction was conducted for 180 minutes with stirring. After the polymerization, the solid was precipitated and the supernatant liquid was removed. The solid was washed with heptane two times. The prepolymerized catalyst thus prepared was resuspended in purified heptane, and the solid catalyst component concentration was adjusted to 4 g/L by controlling the amount of heptane. The prepolymerized catalyst contained 3 g of polyethylene per 1 g of the solid catalyst component.

(4) Polymerization

To a 58-liter tubular polymerization reactor, there were continuously supplied propylene at 28 kg/h, hydrogen at 3 NL/h, the catalyst slurry prepared in (3) at 3.8 g solid catalyst component/h, and triethylaluminum at 5.5 ml/h. Polymerization was carried out in the filled reactor without any gas phase. The temperature and pressure in the tubular reactor were 30° C. and 3.1 MPa/G.

The slurry obtained was fed to a 1000-liter polymerization vessel equipped with a stirrer and polymerization was further conducted by supplying propylene at 130 kg/h and hydrogen to a hydrogen concentration of 0.14 mol % in the gas phase. The polymerization temperature and pressure were 70° C. and 3.0 MPa/G.

The slurry obtained was fed to a 500-liter polymerization vessel equipped with a stirrer and polymerization was further conducted by supplying propylene at 14 kg/h and hydrogen to a hydrogen concentration of 0.14 mol % in the gas phase. The polymerization temperature and pressure were 69° C. and 2.9 MPa/G.

The slurry obtained was fed to a 500-liter polymerization vessel equipped with a stirrer and polymerization was further conducted by supplying propylene at 18 kg/h and hydrogen to a hydrogen concentration of 0.14 mol % in the gas phase. The polymerization temperature and pressure were 68° C. and 2.9 MPa/G.

The slurry obtained was fed to a 500-liter polymerization vessel equipped with a stirrer and polymerization was further conducted by supplying propylene at 14 kg/h and hydrogen to a hydrogen concentration of 0.14 mol % in the gas phase. The polymerization temperature and pressure were 67° C. and 2.8 MPa/G.

The slurry obtained was gasified and subjected to gas-solid separation, and a propylene homopolymer (A-1) for stress-resistant molded articles was obtained. The propylene homopolymer (A-1) was vacuum dried at 80° C. Properties of the propylene homopolymer (A-1) are shown in Table 1.

[Evaluation of Propylene Homopolymer (A-1) as Stress-Resistant Molded Articles]

100 Parts by weight of the propylene homopolymer (A-1) was mixed in a tumbler with 0.1 part by weight of heat stabilizer IRGANOX™ 1010 (manufactured by NihonCiba-Geigy K.K.), 0.1 part by weight of heat stabilizer IRGAFOS™ 168 (manufactured by Nihon Ciba-Geigy K.K.) and 0.1 part by weight of calcium stearate (hydrochloric acid absorbent). The mixture was melt kneaded in a twin-screw extruder and pelletized to give pellets of a polypropylene resin composition. The pellets were injection molded with an injection molding machine (IS100 manufactured by TOSHIBA MACHINE CO., LTD.) to give ASTM test pieces for tensile testing and creep testing. Separately, the pellets were molded with an injection molding machine (IS150E manufactured by TOSHIBA MACHINE CO., LTD.) to give molded articles (test pieces for vibration fatigue testing). The melt kneading conditions and injection molding conditions are described below. Properties of the molded articles are set forth in Table 1.

<Melt Kneading Conditions>
Parallel twin-screw kneader: NR2-36 manufactured by NAKATANI KIKAI K.K.
Kneading temperature: 230° C.
Screw rotation: 200 rpm
Feeder rotation: 500 rpm <Injection Molding Conditions for Tensile Test Pieces and Creep Test Pieces>
Injection molding machine: IS100 manufactured by TOSHIBA MACHINE CO., LTD.
Cylinder temperature: 230° C.
Mold temperature: 40° C.

<Injection Molding Conditions for Vibration Fatigue Test Pieces>
Injection molding machine: IS150E manufactured by TOSHIBA MACHINE CO., LTD.
Cylinder temperature: 230° C.
Mold temperature: 40° C.

Example 2

[Production of Propylene Homopolymer (A-2)]
(1) Production of Solid Catalyst Carrier 300 g of $SiO_2$ was sampled in a 1-liter branched flask and mixed with 800 ml of toluene to give a slurry. The slurry was transferred to a 5-liter four-necked flask and 260 ml of toluene was added. Subsequently, 2830 ml of a toluene solution of methylaluminoxane (hereinafter, MAO) (10 wt % solution) was added, and the mixture was stirred at room temperature for 30 minutes. The mixture was then heated to 110° C. in 1 hour and reacted for 4 hours. After the completion of the reaction, the reaction liquid was cooled to room temperature. The toluene supernatant was removed, and new toluene was added. This substitution was repeated until the substitution rate reached 95%.

(2) Production of Solid Catalyst (Supporting of Metal Catalyst Component on Carrier)

In a glove box, 2.0 g of [3-(1',1',4',4',7',7',10',10'-octamethyloctahydrodibenzo [b,h]fluorenyl)(1,1,3-trimethyl-5-tert-butyl-1,2,3,3a-tetrahydropentalene)]zirconium dichloride was weighed in a 5-liter four-necked flask. The flask was taken outside the glove box, and 0.46 L of toluene and 1.4 L of the MAO/SiO$_2$/toluene slurry prepared in (1) were added under a nitrogen atmosphere. The mixture was stirred for 30 minutes to produce a supported catalyst. The resultant [3-(1',1',4',4',7',7',10',10'-octamethyloctahydrodibenzo [b,h] fluorenyl)(1,1,3-trimethyl-5-tert-butyl-1,2,3,3a-tetrahydropentalene)]zirconium dichloride/MAO/SiO$_2$/toluene slurry was treated with n-heptane to 99% substitution rate. The final slurry volume was controlled to 4.5 L. These operations were carried out at room temperature.

(3) Production of Prepolymerized Catalyst

A 200-liter autoclave equipped with a stirrer was charged with 404 g of the solid catalyst component prepared in (2), 218 ml of triethylaluminum and 100 L of heptane. While the inside temperature was maintained at 15 to 20° C., 1212 g of ethylene was added and reaction was conducted for 180 minutes with stirring. After the polymerization, the solid was precipitated and the supernatant liquid was removed. The solid was washed with heptane two times. The prepolymerized catalyst thus prepared was resuspended in purified heptane, and the solid catalyst component concentration was adjusted to 6 g/L by controlling the amount of heptane. The prepolymerized catalyst contained 3 g of polyethylene per 1 g of the solid catalyst component.

(4) Polymerization

To a 58-liter jacketed tubular circulation polymerization reactor, there were continuously supplied propylene at 35 kg/h, hydrogen at 2.5 NL/h, the catalyst slurry prepared in (3) at 7 g solid catalyst component/h, and triethylaluminum at 8.0 ml/h. Polymerization was carried out in the filled reactor without any gas phase. The temperature and pressure in the tubular reactor were 30° C. and 3.0 MPa/G.

The slurry obtained was fed to a 1000-liter polymerization vessel equipped with a stirrer and polymerization was further conducted by supplying propylene at 85 kg/h and hydrogen to a hydrogen concentration of 0.12 mol % in the gas phase. The polymerization temperature and pressure were 70° C. and 3.0 MPa/G.

The slurry obtained was fed to a 500-liter polymerization vessel equipped with a stirrer and polymerization was further conducted by supplying propylene at 15 kg/h and hydrogen to a hydrogen concentration of 0.12 mol % in the gas phase. The polymerization temperature and pressure were 68° C. and 2.9 MPa/G.

The slurry obtained was gasified and subjected to gas-solid separation, and a propylene homopolymer (A-2) was obtained. The propylene homopolymer (A-2) was vacuum dried at 80° C. Properties of the propylene homopolymer (A-2) are shown in Table 1.

[Evaluation of Propylene Homopolymer (A-2) as Stress-Resistant Molded Articles]

The procedures in Example 1 were repeated except that the propylene homopolymer (A-1) was replaced by the propylene homopolymer (A-2). Properties of the molded articles are set forth in Table 1.

Comparative Example 1

[Production of Propylene Homopolymer (a-1)]

(1) Production of Solid Titanium Catalyst Component 952 g of anhydrous magnesium chloride, 4420 ml of decane and 3906 g of 2-ethylhexyl alcohol were heated at 130° C. for 2 hours to give a uniform solution. 213 g of phthalic anhydride was added to the solution and was dissolved therein by stirring at 130° C. for 1 hour.

The resultant uniform solution was cooled to 23° C., and a 750 ml portion of the uniform solution was added dropwise over a period of 1 hour to 2000 ml of titanium tetrachloride maintained at −20° C. After the dropwise addition, the temperature of the liquid mixture was increased to 110° C. in 4 hours. When the temperature reached 110° C., 52.2 g of diisobutyl phthalate (DIBP) was added, and the mixture was stirred for 2 hours while the temperature was kept constant at the temperature. The solid was collected by hot filtration, then resuspended in 2750 ml of titanium tetrachloride, and heated at 110° C. for 2 hours.

After the heating, the solid was collected by hot filtration and was washed with decane and hexane at 110° C. until no titanium compounds were detected in the washings.

The solid titanium catalyst component prepared as described above was stored as a hexane slurry. A portion of the slurry was dried and the catalyst composition was analyzed. The solid titanium catalyst component was found to contain titanium at 2 wt %, chlorine at 57 wt %, magnesium at 21 wt %, and DIBP at 20 wt %.

(2) Production of Prepolymerized Catalyst

A 200-liter autoclave equipped with a stirrer was charged with 168 g of the solid titanium catalyst component, 37.3 ml of triethylaluminum and 112 L of heptane. While the inside temperature was maintained at 5° C., 1680 g of propylene was added and reaction was conducted for 60 minutes with stirring. After the polymerization, the solid was precipitated and the supernatant liquid was removed. The solid was washed with heptane two times. The prepolymerized catalyst thus prepared was resuspended in purified heptane, and the transition metal catalyst component concentration was adjusted to 1.5 g/L by controlling the amount of heptane. The prepolymerized catalyst contained 10 g of polypropylene per 1 g of the transition metal catalyst component.

(3) Polymerization

To a 500-liter polymerization vessel equipped with a stirrer, there were continuously supplied propylene at 130 kg/h, the catalyst slurry from Production Example 2 (3) at 1.9 g solid catalyst component/h, triethylaluminum at 7.0 ml/h, cyclohexylmethyldimethoxysilane at 4.4 ml/h and hydrogen to a hydrogen concentration of 0.6 mol % in the gas phase. The polymerization temperature and pressure were 70° C. and 3.0 MPa/G.

The slurry obtained was gasified and subjected to gas-solid separation, and a propylene homopolymer (a-1) was obtained. The propylene homopolymer (a-1) was vacuum dried at 80° C. Properties of the propylene homopolymer (a-1) are shown in Table 1.

[Evaluation of Propylene Homopolymer (a-1) as Stress-Resistant Molded Articles]

The procedures in Example 1 were repeated except that the propylene homopolymer (A-1) was replaced by the propylene homopolymer (a-1). Properties of the molded articles are set forth in Table 1.

Comparative Example 2

[Production of Propylene Homopolymer (a-2)]

The procedures in Comparative Example 1 were repeated except that Polymerization (3) was carried out as follows.
(3) Polymerization To a 500-liter polymerization vessel equipped with a stirrer, there were continuously supplied propylene at 130 kg/h, the catalyst slurry from Production Example 2 (3) at 2.2 g solid catalyst component/h, triethylaluminum at 8.3 ml/h, cyclohexylmethyldimethoxysilane at 5.2 ml/h and hydrogen to a hydrogen concentration of 0.2 mol % in the gas phase. The polymerization temperature and pressure were 70° C. and 3.0 MPa/G.

The slurry obtained was gasified and subjected to gas-solid separation, and a propylene homopolymer (a-2) was obtained. The propylene homopolymer (a-2) was vacuum dried at 80° C.

Properties of the propylene homopolymer (a-2) are shown in Table 1.

[Evaluation of Propylene Homopolymer (a-2) as Stress-Resistant Molded Articles]

The procedures in Example 1 were repeated except that the propylene homopolymer (A-1) was replaced by the propylene homopolymer (a-2). Properties of the molded articles are set forth in Table 1.

Comparative Example 3

[Production of Propylene Homopolymer (a-3)]

The procedures in Example 1 were repeated except that Polymerization (4) was carried out as follows.
(4) Polymerization To a 58-liter tubular polymerization reactor, there were continuously supplied propylene at 28 kg/h, hydrogen at 3 NL/h, the catalyst slurry prepared in Example 1 (3) at 0.5 g solid catalyst component/h, and triethylaluminum at 5.5 ml/h. Polymerization was carried out in the filled reactor without any gas phase. The temperature and pressure in the tubular reactor were 30° C. and 3.1 MPa/G.

The slurry obtained was fed to a 1000-liter polymerization vessel equipped with a stirrer and polymerization was further conducted by supplying propylene at 130 kg/h and hydrogen to a hydrogen concentration of 1.1 mol % in the gas phase. The polymerization temperature and pressure were 70° C. and 3.0 MPa/G.

The slurry obtained was fed to a 500-liter polymerization vessel equipped with a stirrer and polymerization was further conducted by supplying propylene at 14 kg/h and hydrogen to a hydrogen concentration of 1.1 mol % in the gas phase. The polymerization temperature and pressure were 69° C. and 2.9 MPa/G.

The slurry obtained was fed to a 500-liter polymerization vessel equipped with a stirrer and polymerization was further conducted by supplying propylene at 18 kg/h and hydrogen to a hydrogen concentration of 1.1 mol % in the gas phase. The polymerization temperature and pressure were 68° C. and 2.9 MPa/G.

The slurry obtained was fed to a 500-liter polymerization vessel equipped with a stirrer and polymerization was further conducted by supplying propylene at 14 kg/h and hydrogen to a hydrogen concentration of 1.1 mol % in the gas phase. The polymerization temperature and pressure were 67° C. and 2.8 MPa/G.

The slurry obtained was gasified and subjected to gas-solid separation, and a propylene homopolymer (a-3) was obtained. The propylene homopolymer (a-3) was vacuum dried at 80° C.

Properties of the propylene homopolymer (a-3) are shown in Table 1.

[Evaluation of Propylene Homopolymer (a-3) as Stress-Resistant Molded Articles]

The procedures in Example 1 were repeated except that the propylene homopolymer (A-1) was replaced by the propylene homopolymer (a-3). Properties of the molded articles are set forth in Table 1.

TABLE 1

| | | | Ex. 1 | Ex. 2 | Comp. Ex. 1 | Comp. Ex. 2 | Comp. Ex. 3 |
|---|---|---|---|---|---|---|---|
| Propylene homopolymer (A) | | | A-1 | A-2 | a-1 | a-2 | a-3 |
| | MFR | g/10 min | 6.6 | 7.0 | 6.1 | 1.6 | 300 |
| | Mn | $\times 10^4$ | 10.8 | 10.5 | 6.0 | 7.8 | 3.1 |
| | Mw/Mn | | 2.2 | 2.3 | 4.8 | 4.9 | 2.2 |
| | Tm | ° C. | 157 | 157 | 160 | 160 | 157 |
| Content of components soluble in o-dichlorobenzene at 90° C. | | wt % | 0.1 | 0.1 | 6.0 | 4.8 | 2.0 |
| Tensile test (23° C.) | Yield strength | MPa | 37 | 37 | 37 | 38 | 38 |
| | Break elongation | % | 400 | 380 | 470 | 400 | 7 |
| Tensile test (80° C.) | Yield strength | MPa | 17 | 17 | 17 | 17 | 19 |
| | Break elongation | % | 210 | 210 | 220 | 220 | 7 |
| Creep test (23° C.) | Strain (after 200 h) | % | 1.29 | 1.3 | 1.39 | 1.31 | Fracture |
| Creep test (80° C.) | Strain (after 200 h) | % | 1.53 | 1.55 | 1.80 | 1.62 | Fracture |
| Vibration fatigue test | Cycles to fracture (25 MPa stress) | cycles | $8.3 \times 10^3$ | $8.1 \times 10^3$ | $4.5 \times 10^3$ | $4.3 \times 10^3$ | $2.6 \times 10^3$ |
| | Cycles to fracture (20 MPa stress) | cycles | $1.9 \times 10^6$ | $1.9 \times 10^6$ | $2.4 \times 10^5$ | $1.9 \times 10^5$ | $3.9 \times 10^4$ |

Example 3

In a tumbler, 85 parts by weight of the propylene homopolymer (A-1) and 15 parts by weight of a propylene/ethylene copolymer rubber (B-a-1) (TAFMER™ S-4020 manufactured by Mitsui Chemicals Inc.) were mixed, based on 100 parts by weight thereof, with 0.1 part by weight of heat stabilizer IRGANOX™ 1010 (manufactured by Nihon Ciba-Geigy K.K.), 0.1 part by weight of heat stabilizer IRGAFOS™ 168 (manufactured by Nihon Ciba-Geigy K.K.) and 0.1 part by weight of calcium stearate (hydrochloric acid absorbent). The mixture was melt kneaded in a twin-screw extruder and pelletized to give pellets of a polypropylene resin composition (polypropylene resin composition containing elastomer (B)). The pellets were injection molded with an injection molding machine (IS100 manufactured by TOSHIBA MACHINE CO., LTD.) to give ASTM test pieces for tensile testing and creep testing. Separately, the pellets were molded with an injection molding machine (IS150E manufactured by TOSHIBA MACHINE CO., LTD.) to give molded articles (test pieces for vibration fatigue testing). Properties of the molded articles are set forth in Table 2.

<Melt Kneading Conditions>
Parallel twin-screw kneader: NR2-36 manufactured by NAKATANI KIKAI K.K.
Kneading temperature: 230° C.
Screw rotation: 200 rpm
Feeder rotation: 500 rpm
<Injection Molding Conditions for Tensile Test Pieces and Creep Test Pieces>
Injection molding machine: IS100 manufactured by TOSHIBA MACHINE CO., LTD.
Cylinder temperature: 230° C.
Mold temperature: 40° C.
<Injection Molding Conditions for Vibration Fatigue Test Pieces>
Injection molding machine: IS150E manufactured by TOSHIBA MACHINE CO., LTD.
Cylinder temperature: 230° C.
Mold temperature: 40° C.

Comparative Example 4

The procedures in Example 3 were repeated except that 85 parts by weight of the propylene homopolymer (A-1) was replaced by 85 parts by weight of the propylene homopolymer (a-1). Properties of the molded articles are set forth in Table 2.

TABLE 2

|  |  |  | Ex. 3 | Comp. Ex. 4 |
| --- | --- | --- | --- | --- |
| Propylene homopolymer (A-1) |  | wt % | 85 | 0 |
| Propylene homopolymer (a-1) |  | wt % | 0 | 85 |
| Propylene/ethylene copolymer rubber (B-a-1) |  | wt % | 15 | 15 |
| MFR |  | g/10 min | 5.5 | 5.1 |
| Tensile test (23° C.) | Yield strength | MPa | 26 | 26 |
|  | Break elongation | % | 350 | 300 |
| Vibration fatigue test | Cycles to fracture (10 MPa stress) | cycles | $2.0 \times 10^5$ | $3.0 \times 10^4$ |

Example 4

[Production of Propylene Homopolymer (A-3)]
The procedures of Production Example 1 were repeated except that the polymerization was carried out as follows.
(1) Production of Solid Catalyst (Supporting of Metal Catalyst Component on Carrier)
In a glove box, 2.0 g of isopropyl(3-tert-butyl-5-methylcyclopentadienyl)(3,6-di-tert-butylfluorenyl)zirconium dichloride was weighed in a 5-liter four-necked flask. The flask was taken outside the glove box, and 0.46 L of toluene and 1.4 L of the MAO/SiO$_2$/toluene slurry prepared in Example 2 (1) were added under a nitrogen atmosphere. The mixture was stirred for 30 minutes to produce a supported catalyst. The resultant isopropyl(3-tert-butyl-5-methylcyclopentadienyl)(3,6-di-tert-butylfluorenyl)zirconium dichloride/MAO/SiO$_2$/toluene slurry was treated with n-heptane to 99% substitution rate. The final slurry volume was controlled to 4.5 L. These operations were carried out at room temperature.
(2) Production of Prepolymerized Catalyst
A 200-liter autoclave equipped with a stirrer was charged with 404 g of the solid catalyst component prepared in (1) above, 218 ml of triethylaluminum and 100 L of heptane. While the inside temperature was maintained at 15 to 20° C., 1212 g of ethylene was added and reaction was conducted for 180 minutes with stirring. After the polymerization, the solid was precipitated and the supernatant liquid was removed. The solid was washed with heptane two times. The prepolymerized catalyst thus prepared was resuspended in purified heptane, and the solid catalyst component concentration was adjusted to 6 g/L by controlling the amount of heptane. The prepolymerized catalyst contained 3 g of polyethylene per 1 g of the solid catalyst component.
(3) Polymerization
To a 58-liter jacketed tubular circulation polymerization reactor, there were continuously supplied propylene at 35 kg/h, hydrogen at 2.5 NL/h, the catalyst slurry prepared in (2) at 17 g solid catalyst component/h, and triethylaluminum at 8.0 ml/h. Polymerization was carried out in the filled reactor without any gas phase. The temperature and pressure in the tubular reactor were 30° C. and 3.1 MPa/G.
The slurry obtained was fed to a 1000-liter polymerization vessel equipped with a stirrer and polymerization was further conducted by supplying propylene at 85 kg/h and hydrogen to a hydrogen concentration of 0.14 mol % in the gas phase. The polymerization temperature and pressure were 70° C. and 3.0 MPa/G.
The slurry obtained was fed to a 500-liter polymerization vessel equipped with a stirrer and polymerization was further conducted by supplying propylene at 15 kg/h and hydrogen to a hydrogen concentration of 0.14 mol % in the gas phase. The polymerization temperature and pressure were 68° C. and 2.9 MPa/G.
The slurry obtained was gasified and subjected to gas-solid separation, and a propylene homopolymer (A-3) was obtained. The propylene homopolymer (A-3) was vacuum dried at 80° C.

[Preparation of Polypropylene Resin Composition Containing Filler (C) (Short Glass Fiber-Reinforced PP) and Evaluation thereof as Stress-Resistant Molded Articles]

79 Parts by weight of the propylene homopolymer (A-3), 20 parts by weight of glass fibers (average fiber diameter: 10 μm, average length: 3 mm, chopped strands that were surface treated with an aminosilane coupling agent) and 1 part by weight of maleic anhydride-modified polypropylene were blended in a twin-screw extruder in a manner such that the components other than the glass fibers were dry blended and supplied to a hopper in a constant amount through a volumetric feeder, and the glass fibers were fed in a constant amount through a volumetric feeder to a side feed port after the resins were molten. The materials were kneaded together at 200° C. and pelletized to give a polypropylene resin composition containing a filler (C) (short glass fiber-reinforced PP).
The pellets were molded with an injection molding machine (ROBOSHOT α-100B manufactured by FANUC) to afford molded articles (test pieces for vibration fatigue testing). Properties of the molded articles are set forth in Table 3.

<Melt Kneading Conditions>
Parallel twin-screw kneader: TEX-30α manufactured by The Japan Steel Works, Ltd.
Kneading temperature: 210° C.
<Injection Molding Conditions for Tensile Test Pieces and Vibration Fatigue Test Pieces>
Injection molding machine: ROBOSHOT α-100B manufactured by FANUC
Cylinder temperature: 230° C.
Mold temperature: 40° C.

Example 5

[Production of Propylene Homopolymer (A-4)]

The procedures of Example 4 for producing the propylene homopolymer (A-3) were repeated except that the polymerization was carried out as follows.

(1) Polymerization

To a 58-liter jacketed tubular circulation polymerization reactor, there were continuously supplied propylene at 35 kg/h, hydrogen at 2.5 NL/h, the catalyst slurry prepared in Example 4 (2) at 13 g solid catalyst component/h, and triethylaluminum at 8.0 ml/h. Polymerization was carried out in the filled reactor without any gas phase. The temperature and pressure in the tubular reactor were 30° C. and 3.1 MPa/G.

The slurry obtained was fed to a 1000-liter polymerization vessel equipped with a stirrer and polymerization was further conducted by supplying propylene at 85 kg/h and hydrogen to a hydrogen concentration of 0.19 mol % in the gas phase. The polymerization temperature and pressure were 70° C. and 3.0 MPa/G.

The slurry obtained was fed to a 500-liter polymerization vessel equipped with a stirrer and polymerization was further conducted by supplying propylene at 15 kg/h and hydrogen to a hydrogen concentration of 0.19 mol % in the gas phase. The polymerization temperature and pressure were 68° C. and 2.9 MPa/G.

The slurry obtained was gasified and subjected to gas-solid separation, and a propylene homopolymer (A-4) was obtained. The propylene homopolymer (A-4) was vacuum dried at 80° C.

[Preparation of Polypropylene Resin Composition Containing Filler (C) (Short Glass Fiber-Reinforced PP) and Evaluation thereof as Stress-Resistant Molded Articles]

The procedures in Example 4 were repeated except that the propylene homopolymer (A-3) was replaced by the propylene homopolymer (A-4). Properties of the molded articles are set forth in Table 3.

Example 6

[Production of Propylene Homopolymer (A-5)]

The procedures of Example 5 were repeated except that the polymerization was carried out as follows.

(1) Polymerization

To a 58-liter jacketed tubular circulation polymerization reactor, there were continuously supplied propylene at 35 kg/h, hydrogen at 2.5 NL/h, the catalyst slurry prepared in Example 4 (2) at 12 g solid catalyst component/h, and triethylaluminum at 8.0 ml/h. Polymerization was carried out in the filled reactor without any gas phase. The temperature and pressure in the tubular reactor were 30° C. and 301 MPa/G.

The slurry obtained was fed to a 1000-liter polymerization vessel equipped with a stirrer and polymerization was further conducted by supplying propylene at 85 kg/h and hydrogen to a hydrogen concentration of 0.22 mol % in the gas phase. The polymerization temperature and pressure were 70° C. and 3.0 MPa/G.

The slurry obtained was fed to a 500-liter polymerization vessel equipped with a stirrer and polymerization was further conducted by supplying propylene at 15 kg/h and hydrogen to a hydrogen concentration of 0.22 mol % in the gas phase. The polymerization temperature and pressure were 68° C. and 2.9 MPa/G.

The slurry obtained was gasified and subjected to gas-solid separation, and a propylene homopolymer (A-5) was obtained. The propylene homopolymer (A-5) was vacuum dried at 80° C.

[Preparation of Polypropylene Resin Composition containing Filler (C) (Short Glass Fiber-Reinforced PP) and Evaluation thereof as Stress-Resistant Molded Articles]

The procedures in Example 4 were repeated except that the propylene homopolymer (A-3) was replaced by the propylene homopolymer (A-5). Properties of the molded articles are set forth in Table 3.

Comparative Example 5

[Production of Propylene Homopolymer (a-4)]

(1) Production of Solid Titanium Catalyst Component 952 g of anhydrous magnesium chloride, 4420 ml of decane and 3906 g of 2-ethylhexyl alcohol were heated at 130° C. for 2 hours to give a uniform solution. 213 g of phthalic anhydride was added to the solution and was dissolved therein by stirring at 130° C. for 1 hour.

The resultant uniform solution was cooled to 23° C., and a 750 ml portion of the uniform solution was added dropwise over a period of 1 hour to 2000 ml of titanium tetrachloride maintained at −20° C. After the dropwise addition, the temperature of the liquid mixture was increased to. 110° C. in −4 hours. When the temperature reached 110° C., 52.2 g of diisobutyl phthalate (DIBP) was added, and the mixture was stirred for 2 hours while the temperature was kept constant at the temperature. The solid was collected by hot filtration, then resuspended in 2750 ml of titanium tetrachloride, and heated at 110° C. for 2 hours.

After the heating, the solid was collected by hot filtration and was washed with decane and hexane at 110° C. until no titanium compounds were detected in the washings.

The solid titanium catalyst component prepared as described above was stored as a hexane slurry. A portion of the slurry was dried and the catalyst composition was analyzed. The solid titanium catalyst component was found to contain titanium at 2 wt %, chlorine at 57 wt %, magnesium at 21 wt %, and DIBP at 20 wt %.

(2) Production of Prepolymerized Catalyst

A 200-liter autoclave equipped with a stirrer was charged with 56 g of the solid titanium catalyst component prepared in (1) above, 20.7 ml of triethylaluminum and 80 L of heptane. While the inside temperature was maintained at 5° C., 560 g of propylene was added and reaction was conducted for 60 minutes with stirring. After the polymerization, the solid was precipitated and the supernatant liquid was removed. The solid was washed with heptane two times. The prepolymerized catalyst thus prepared was resuspended in purified heptane, and the transition metal catalyst component concentration was adjusted to 0.7 g/L by controlling the amount of heptane. The prepolymerized catalyst contained 10 g of polypropylene per 1 g of the solid titanium catalyst component.

(3) Polymerization

To a 58-liter jacketed tubular circulation polymerization reactor, there were continuously supplied propylene at 30 kg/h, hydrogen at 33 NL/h, the catalyst slurry at 0.6 g transition metal catalyst component/h, triethylaluminum at 1.9 ml/h, and cyclohexylmethyldimethoxysilane at 1.1 ml/h. Polymerization was carried out in the filled reactor without any gas phase. The temperature and pressure in the tubular reactor were 70° C. and 3.6 MPa/G.

The slurry obtained was fed to a 100-liter polymerization vessel equipped with a stirrer and polymerization was further conducted by supplying propylene at 15 kg/h and hydrogen to a hydrogen concentration of 2.2 mol % in the gas phase. The polymerization temperature and pressure were 70° C. and 3.1 MPa/G.

The slurry obtained was gasified and subjected to gas-solid separation, and a propylene homopolymer (a-4) was obtained. The propylene homopolymer (a-4) was vacuum dried at 80° C.

[Preparation of Polypropylene Resin Composition Containing Filler (C) (Short Glass Fiber-Reinforced PP) and Evaluation thereof as Stress-Resistant Molded Articles]

The slurry obtained was fed to a 100-liter polymerization vessel equipped with a stirrer and polymerization was further conducted by supplying propylene at 15 kg/h and hydrogen to a hydrogen concentration of 3.0 mol % in the gas phase. The polymerization temperature and pressure were 70° C. and 3.2 MPa/G.

The slurry obtained was gasified and subjected to gas-solid separation, and a propylene homopolymer (a-5) was obtained. The propylene homopolymer (a-5) was vacuum dried at 80° C.

[Preparation of Polypropylene Resin Composition Containing Filler (C) (Short Glass Fiber-Reinforced PP) and Evaluation thereof as Stress-Resistant Molded Articles]

The procedures in Example 4 were repeated except that the propylene homopolymer (A-3) was replaced by the propylene homopolymer (a-5) Properties of the molded articles are set forth in Table 3.

TABLE 3

| | Propylene homopolymer | | | Ex. 4 A-3 | Ex. 5 A-4 | Ex. 6 A-5 | Comp. Ex. 5 a-4 | Comp. Ex. 6 a-5 |
|---|---|---|---|---|---|---|---|---|
| Propylene homopolymer basic properties | MFR | | g/10 min | 8 | 15 | 20 | 9 | 15.0 |
| | Mn | | ×10$^4$ | 10.3 | 8.7 | 8.0 | 5.4 | 4.5 |
| | Mw/Mn | | | 2.3 | 2.2 | 2.2 | 4.9 | 4.8 |
| | Tm | | ° C. | 157 | 157 | 157 | 160 | 160 |
| | Content of components soluble in o-dichlorobenzene at 90° C. | | wt % | 0.1 | 0.1 | 0.1 | 7.6 | 8.5 |
| GFPP formulation | Propylene homopolymer | | | 79.0 | 79.0 | 79.0 | 79.0 | 79.0 |
| | Modified PP | | | 1.0 | 1.0 | 1.0 | 1.0 | 1.0 |
| | Glass fibers | | | 20 | 20 | 20 | 20 | 20 |
| GFPP basic properties | MFR | | g/10 min | 1.4 | 2.8 | 2.8 | 2.0 | 3.2 |
| | Density | | kg/m$^3$ | 1,030 | 1,030 | 1,030 | 1,030 | 1,030 |
| | Tensile breakage stress | 23° C. | MPa | 88 | 91 | 91 | 90 | 91 |
| | Tensile breakage strain | | % | 4 | 3 | 3 | 3 | 3 |
| GFPP practical properties | Weld strength | | MPa | 38 | 38 | 37 | 37 | 37 |
| | Vibration fatigue (weld) | 85° C., 5 MPa, 1 Hz | cycles | 5.3 × 10$^4$ | 3.0 × 10$^4$ | 1.7 × 10$^4$ | 2.0 × 10$^4$ | 6.4 × 10$^3$ |
| | Vibration fatigue (non-weld) | 80° C., 15 MPa, 16 Hz | cycles | 2.7 × 10$^3$ | 4.5 × 10$^3$ | 1.2 × 10$^4$ | 2.4 × 10$^3$ | 2.2 × 10$^3$ |
| | | 80° C., 12.5 MPa, 16 Hz | cycles | 4.5 × 10$^6$ | 5.1 × 10$^6$ | 1.3 × 10$^6$ | 7.7 × 10$^4$ | 7.4 × 10$^4$ |

The procedures in Example 4 were repeated except that the propylene homopolymer (A-3) was replaced by the propylene homopolymer (a-4). Properties of the molded articles are set forth in Table 3.

Comparative Example 6

[Production of Propylene Homopolymer (a-5)]

The procedures of Comparative Example 5 for producing the propylene homopolymer (a-4) were repeated except that the polymerization was carried out as follows.

(1) Polymerization

To a 58-liter jacketed tubular circulation polymerization reactor, there were continuously supplied propylene at 30 kg/h, hydrogen at 46 NL/h, the catalyst slurry at 0.5 g transition metal catalyst component/h, triethylaluminum at 1.8 ml/h, and cyclohexylmethyldimethoxysilane at 1.1 ml/h. Polymerization was carried out in the filled reactor without any gas phase. The temperature and pressure in the tubular reactor were 70° C. and 3.6 MPa/G.

INDUSTRIAL APPLICABILITY

The propylene homopolymers and the polypropylene resin compositions containing the propylene homopolymers according to the present invention give molded articles excellent in vibration fatigue strength and creep properties. The molded articles are therefore suitably used as parts requiring reliability for a long period such as automotive parts and housing parts.

The invention claimed is:

1. A stress-resistant molded article which is obtained from a polypropylene resin composition, wherein the polypropylene resin composition comprises 30 to 95 wt % of a propylene homopolymer (A) and 5 to 70 wt % of a filler (C) (wherein the total of the propylene homopolymer (A) and the filler (C) is 100 wt %),
   wherein the filler (C) is glass fibers,
   wherein the propylene homopolymer (A) satisfies the following requirements (1) to (5):

(1) the ratio (Mw/Mn) of weight average molecular weight (Mw) to number average molecular weight (Mn) according to GPC is in the range of 2.0 to 2.5;
(2) Mn is in the range of 87,000 to 400,000;
(3) the content of components soluble in o-dichlorobenzene at 90° C. is not more than 2 wt %;
(4) the melting point (Tm) is not less than 157° C.; and
(5) the melt flow rate (accordance with ASTM D 1238, 230° C., 2.16 kg load) is in the range of 0.1 to 15 g/10 min.

2. A stress-resistant molded article which is obtained from a polypropylene resin composition, which is formed by injection molding, wherein the injection molding involves a mold that is designed to form a weld, and
wherein the polypropylene resin composition comprises 30 to 95 wt % of a propylene homopolymer (A) and 5 to 70 wt % of a filler (C) (wherein the total of the propylene homopolymer (A) and the filler (C) is 100 wt %),
wherein the filler (C) is glass fibers,
wherein the propylene homopolymer (A) satisfies the following requirements (1) to (5):
(1) the ratio (Mw/Mn) of weight average molecular weight (Mw) to number average molecular weight (Mn) according to GPC is in the range of 2.0 to 2.5;
(2) Mn is in the range of 87,000 to 400,000;
(3) the content of components soluble in o-dichlorobenzene at 90° C. is not more than 4 wt %;
(4) the melting point (Tm) is not less than 157° C.; and
(5) the melt flow rate (accordance with ASTM D 1238, 230° C., 2.16 kg load) is in the range of 0.1 to 15 g/10 min.

3. The stress-resistant molded article according to claim 2, wherein the molded article has a metal insert.

4. The stress-resistant molded article according to claim 2, which is an automotive part, a two-wheeled vehicle or bicycle part, a housing part, a home appliance part or an electric power tool part.

5. The stress-resistant molded article according to claim 2, which is an engine fan, a cooling fan or a fan shroud.

6. The stress-resistant molded article according to claim 2, wherein the polypropylene resin composition satisfies the following requirement:
the cycle of the vibration fatigue test (weld) is not less than $3.0 \times 10^4$, wherein the vibration fatigue test (weld) employs a welded test piece generally configured in a dumbbell shape having a whole length of 220 mm, a central line portion length of 57 mm, a terminal width of 19 mm, a central line portion width of 13 mm, and a thickness of 3.2 mm, and wherein the notch radius is 76 mm, the welded test piece being produced by injection molding of the polypropylene resin composition at a cylinder temperature of 230° C. and at a mold temperature of 40° C., and wherein the vibration fatigue test (weld) is carried out at a temperature of 85° C., a frequency of 1 Hz, a tensile deformation stress of 5 MPa, and a chuck distance of 115 mm.

\* \* \* \* \*

UNITED STATES PATENT AND TRADEMARK OFFICE
CERTIFICATE OF CORRECTION

PATENT NO. : 10,370,465 B2  
APPLICATION NO. : 12/448983  
DATED : August 6, 2019  
INVENTOR(S) : Itakura et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1074 days.

Signed and Sealed this  
Second Day of June, 2020

Andrei Iancu  
*Director of the United States Patent and Trademark Office*